(12) United States Patent
Hannah

(10) Patent No.: US 9,025,313 B2
(45) Date of Patent: May 5, 2015

(54) ENERGY STORAGE DEVICES WITH AT LEAST ONE POROUS POLYCRYSTALLINE SUBSTRATE

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 13/584,488

(22) Filed: Aug. 13, 2012

(65) Prior Publication Data

US 2014/0043729 A1 Feb. 13, 2014

(51) Int. Cl.
| H01G 9/00 | (2006.01) |
|---|---|
| H01G 11/28 | (2013.01) |
| H01G 11/36 | (2013.01) |
| H01G 11/68 | (2013.01) |

(52) U.S. Cl.
CPC .............. *H01G 11/28* (2013.01); *Y10T 29/417* (2015.01); *Y02E 60/13* (2013.01); *H01G 11/36* (2013.01); *H01G 11/68* (2013.01)

(58) Field of Classification Search
None
See application file for complete search history.

(56) References Cited

U.S. PATENT DOCUMENTS

| 2007/0022590 A1* | 2/2007 | Hirano et al. ................ 29/25.03 |
| 2009/0202911 A1* | 8/2009 | Fukuoka et al. ........... 429/231.8 |
| 2009/0317722 A1* | 12/2009 | Watanabe ................ 429/231.95 |

FOREIGN PATENT DOCUMENTS

| JP | 2001-155622 | 6/2001 |
|---|---|---|
| JP | 2003-109902 | 4/2003 |
| JP | 2004-231493 | 8/2004 |
| JP | 2007-087854 | 4/2007 |
| WO | WO 2008/140596 | 11/2008 |
| WO | WO-2011/123135 | 10/2011 |
| WO | WO-2013/048465 | 4/2013 |
| WO | WO-2013/066337 | 5/2013 |
| WO | WO-2013/100916 | 7/2013 |

OTHER PUBLICATIONS

International Search Report and the Written Opinion of the International Searching Authority, for Application No. PCT/US2013/045215, 12 pgs., (May 14, 2014).
Notification Concerning Transmittal of Copy of International Preliminary Report on Patentability for International Application No. PCT/US2013/045215 mailed Feb. 26, 2015, 9 pages.

* cited by examiner

*Primary Examiner* — Dion R Ferguson
(74) *Attorney, Agent, or Firm* — Blakely, Sokoloff, Taylor & Zafman LLP

(57) ABSTRACT

In one embodiment, a structure for a energy storage device may include at one polycrystalline substrate. The grain size may be designed to be at least a size at which phonon scattering begins to dominate over grain boundary scattering in the polycrystalline substrate. The structure also includes a porous structure containing multiple channels within the polycrystalline substrate.

24 Claims, 7 Drawing Sheets

ENERGY STORAGE DEVICES WITH AT LEAST ONE POROUS POLYCRYSTALLINE SUBSTRATE

TECHNICAL FIELD

The disclosed embodiments of the invention relate generally to energy storage devices, and relate more particularly to capacitors with porous capacitor plates.

BACKGROUND

Energy storage devices, including batteries and capacitors, are used extensively in electronic devices. In particular, capacitors are widely used for applications ranging from electrical circuitry and power delivery to voltage regulation and battery replacement. As capacitor technology has continued to develop, several types have emerged. For example, electric double-layer capacitors (EDLCs), also referred to as ultracapacitors (among other names), are characterized by high energy storage and power density, small size, and low weight and have thus become promising candidates for use in several applications. In one approach, these ultracapacitors are carbon-based and lack an open-pore structure as conventional processing options are unavailable.

BRIEF DESCRIPTION OF THE DRAWINGS

The disclosed embodiments will be better understood from a reading of the following detailed description, taken in conjunction with the accompanying figures in the drawings in which.

Figure 1:
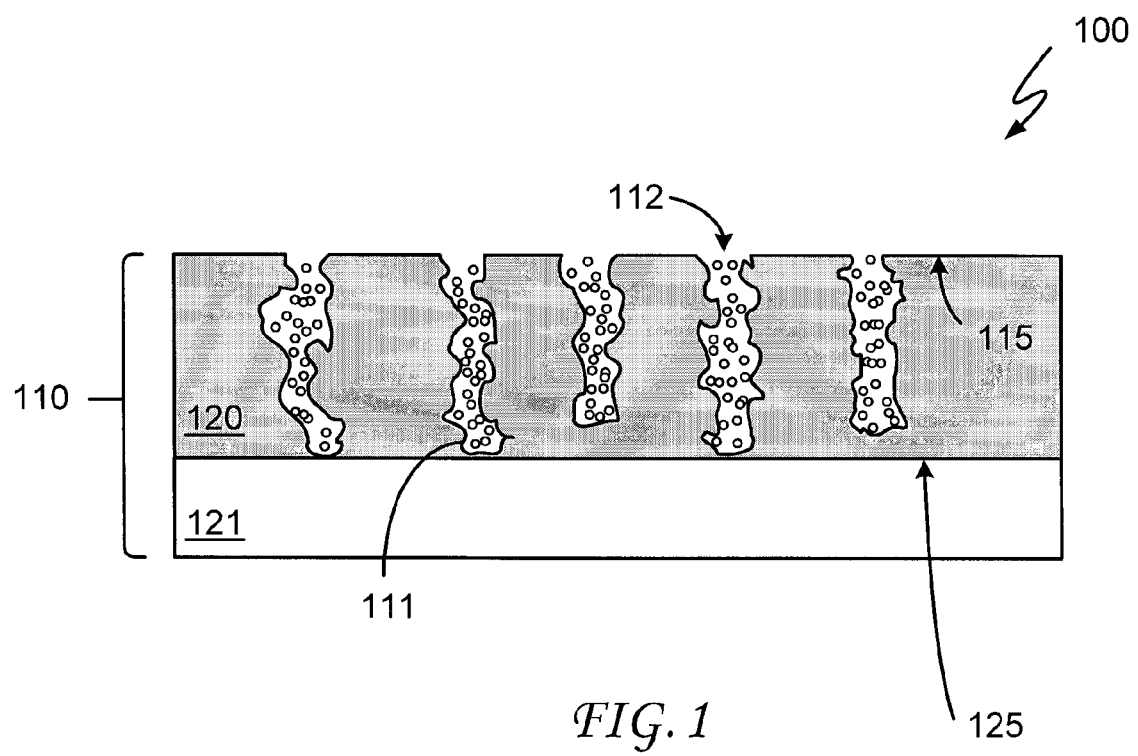
FIG. 1 is a cross-sectional view of a porous structure according to an embodiment of the present invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements, while similar reference numerals may, but do not necessarily, denote similar elements.

DETAILED DESCRIPTION

In one embodiment, a structure for a energy storage device may include a polycrystalline substrate. The grain size may be designed to be at least a size at which phonon scattering begins to dominate over grain boundary scattering. The structure also includes a porous structure containing multiple channels within the polycrystalline substrate. In the production of electrochemical ultracapacitors, there is a need to create cost effective capacitor plates for mass production. Processing porous material at high temperatures in excess of 400° C. allows the use of atomic layer deposition (ALD) to coat hundreds of microns deep in pores (e.g., 40 nm wide pores). However, cost effective capacitor plates are currently unable to be achieved given several shortcomings of currently known substrate materials.

One shortcoming is hydrogen desorption which leads to layer delamination for sufficiently deep pores. Another shortcoming is plastic flow and a closing of nano-pores due to high temperature processing which can lead to a reduction of the surface area per cubic centimeter. Yet another shortcoming is that the surface of porous silicon requires passivation to stop electrochemical reactions from occurring under voltage charging. Unpassivated silicon is a highly reactive material and is very resistive due to surface traps. These characteristics of unpassivated silicon cause large series resistances in poly-silicon plates which results in ohmic losses during charging and discharging of the ultracapacitor.

Currently, approaches utilize ALD to create conductive, chemically stable layers. However, this strategy suffers from the aforementioned temperature limitations and requires additional materials beyond the silicon of the substrate, which can be costly. Current approaches also utilize carbon to overcome the aforementioned passivation and surface conductivity shortcomings. Some benefits of utilizing carbon are that it is chemically stable and that it has high conductivity, generally due to the presence of graphene layers inside the pores. However, commercial, carbon-based ultracapacitors lack the open pore structure and processing options of an electro-etched solid semiconductor such as silicon.

Referring now to the drawings, FIG. 1 is a cross-sectional view of a porous structure 100 according to an embodiment of the present invention. Porous structure 100 includes porous layer 120 with multiple channels 111 within a polycrystalline substrate 110. The shaded region 120 distinguishes the porous layer from the non-porous layer 121. The substrate material in the shaded region 120 may be the same material as the non-shaded region 121. In one embodiment, the non-shaded region may be removed or reduced in thickness to minimize its size for implementation in a compact device. The porous layer boundary 125 represents the average pore depth of an array of channels within the polycrystalline substrate. In one embodiment, each channel may have an opening 112 to a porous surface 115 of the polycrystalline substrate 110. In other embodiments, the substrate may be formed with different manufacturing techniques and may include different materials (e.g., carbon). Each channel may not have an opening to a porous surface of the substrate. The polycrystalline substrate 110 or substrate may be designed with a certain grain size, which will be explained in more detail herein.

In one embodiment, the polycrystalline substrate with a designed and optimized grain size may include silicon, silicon carbide, germanium, carbon, tin, or any other material that can be etched to make porous materials having a large surface area. Possible advantages of using silicon include its compatibility with existing silicon technology. Germanium enjoys a similar advantage as a result of existing technology for that material and, as compared to silicon, enjoys the further possible advantage that its native oxide (germanium oxide) is water-soluble and so is easily removed. (The native oxide that forms on the surface of silicon may trap charge—which is an undesirable result.) Germanium is also highly compatible with silicon technology. Possible advantages of using tin, which is a zero-band-gap material, include its enhanced conductivity with respect to certain other conductive and semiconductive materials. Other materials may also be used for the porous structure, including silicon carbide, alloys such as an alloy of silicon and germanium, and metals such as copper, aluminum, nickel, calcium, tungsten, molybdenum, and manganese. A silicon—germanium alloy, for example, will advantageously exhibit a much smaller volume difference than a pure germanium structure.

Among the group of materials disclosed above, silicon carbide may be a desirable material from which to construct the polycrystalline substrate. It is a low cost material in polycrystalline form and melts at approximately 1,000° C. above the melting point of silicon. It also has enormous structural and thermal strength and can be made porous by anodic etching in a similar manner as silicon. By introducing carbon-containing gasses into the pores at several hundred degrees Celsius, the surface of the pores in a silicon carbide substrate may be coated with plates of graphene of a certain thickness (e.g., nanometer thickness). This formation of graphene inside the pores may passivate the surface of the pores and convert the pore walls into highly conductive plates. Furthermore, the high temperature stability of silicon carbide may allow the use of ALD processes which may require process temperatures hundreds of degrees Celsius above that of silicon. This may permit much faster diffusion rates into deep pores and the full conversion of surface compounds into their equilibrium state.

Figure 2:
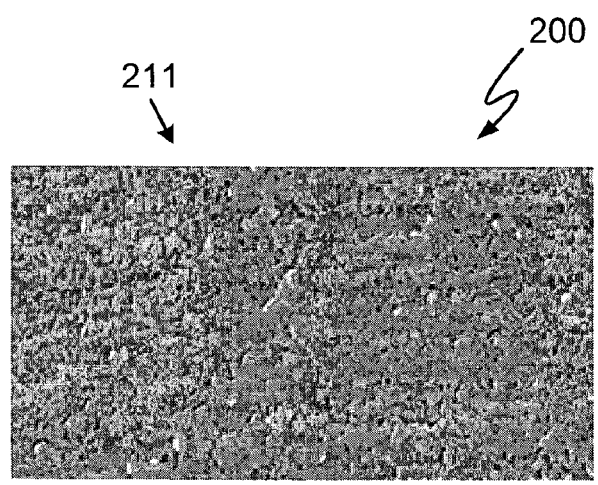
FIG. 2 is a topographical scanning electron microscope image of a piece of porous silicon according to an embodiment of the present invention.

FIG. 2 is a topographical scanning electron microscope (SEM) image showing a piece of porous silicon 200 according to an embodiment of the invention. As illustrated, porous silicon 200 contains multiple channels 211, some of which may appear elongated vertically and some of which may appear as roughly circular holes. The latter group represents channels for which the visible portion is oriented horizontally. It should be understood that channels 211 are likely to twist and turn along their lengths such that a single channel may have both vertical and horizontal portions as well as portions that are neither completely vertical nor completely horizontal but fall somewhere in between.

With the right etchant, it should be possible to make porous structures having the described characteristics from a wide variety of materials. As an example, a porous silicon structure may be created by etching a silicon substrate with a mixture of hydrofluoric acid (HF) and alcohol (ethanol, methanol, isopropyl, etc.). More generally, porous silicon and other porous structures may be formed by such processes as anodization and stain etching.

In certain embodiments, the smallest dimension of each one of the channels is no greater than 1 micrometer (µm). This upper size limit for the smallest dimension of the channels may be chosen for particular embodiments in order to maximize the surface area of the porous structures of those embodiments. Smaller (e.g., narrower) channels lead to increased overall surface area for each electrically conductive structure because a larger number of such narrower channels can fit into an electrically conductive structure of a given size. Because capacitance is proportional to surface area, channels constrained in size in the manner described would likely, and advantageously, result in capacitors with increased capacitance. (The channels' other dimensions, e.g., their lengths, may also be manipulated in order to increase surface area (or to achieve some other result)—i.e., longer channels may be preferred over shorter ones—but otherwise are likely to be less critical than the smallest dimension discussed above.) In other embodiments, the smallest dimension of the channels may be larger than 1 µm—perhaps as large as 10 µm or more. Although they would decrease the surface area, such larger channels may provide more interior space in which to grow or otherwise form additional structures, if desired. At least one such embodiment is discussed below.

Figure 3:
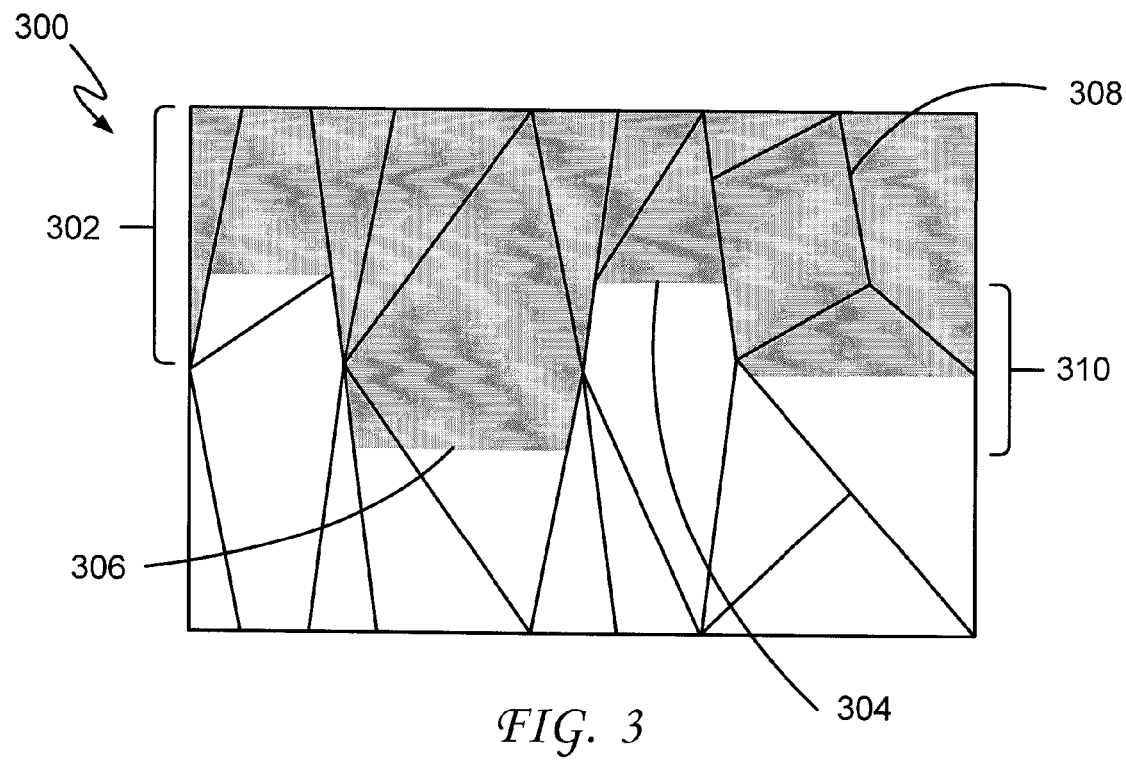
FIG. 3 is a cross-sectional view of a porous capacitor plate with a polycrystalline substrate having a large grain size according to an embodiment of the present invention.

FIG. 3 is a cross-sectional view of a porous polycrystalline substrate 300 having a large grain size according to an embodiment of the present invention. As illustrated in FIG. 3, porous polycrystalline substrate 300 may include a large grain size defined by grain boundaries 308. It is to be noted that when grain sizes are too large, anodic etching of the pores may suffer from various problems. One problem may be that the orientation of large crystals exerts a strong negative effect on the process of forming pores. Another problem may be that physical differences at grain boundaries 308, such as enhanced diffusivities and lower chemical stability, may lead to preferential etching in certain areas of the polycrystalline substrate. Yet another problem may be that majority carriers located at the grain boundaries 308 may be depleted, having a large effect on the etch rate at grain boundaries 308. As a result, porous layer 302 (represented in the porous substrate 300 with a large grain size defined by grain boundaries 308) is shown to possess large pore depth variation 310 represented by the height difference between depths 306 and 304. It should be noted that the shaded section representing the porous layer 302 may include an array of channels 111 as depicted in FIG. 1. A large variation of pore depths may be undesirable due to the unpredictability in determining the total capacitance of the ultracapacitor, which leads to an unreliable ultracapacitor.

On the other hand, an amorphous silicon substrate may be an option for creating pores because it avoids the issue of grain orientation and large grain boundaries. However, this may be difficult to utilize due to the fact that amorphous silicon possesses an electrochemical instability which may limit the maximum obtainable thickness in porous material. As a result, amorphous silicon may etch poorly for plate thicknesses beyond 200 nm. Due to this limitation, amorphous silicon may be unworkable because a practical ultracapacitor may require pores that are several hundred microns deep.

Figure 4:
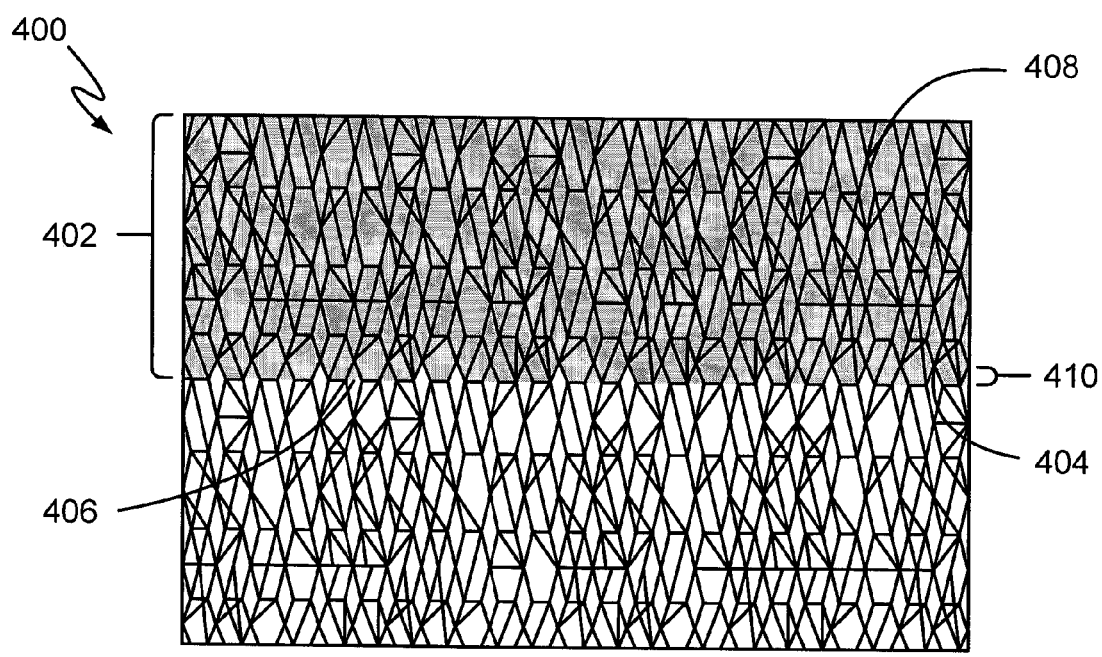
FIG. 4 is a cross-sectional view of a porous capacitor plate with a polycrystalline substrate comprising an optimal grain size according to an embodiment of the present invention.

FIG. 4 is a cross-sectional view of a porous polycrystalline substrate 400 that is structured with a desirable grain size according to an embodiment of the present invention. As illustrated in FIG. 4, porous polycrystalline substrate 400 (e.g., porous capacitor plate) may include a desirable grain size defined by grain boundaries 408. The grain size defined by grain boundaries 408 may be designed to allow for a more uniform porous layer 402 because the optimal grain boundaries 408 may be evenly distributed throughout the polycrystalline substrate, thereby averaging pore depth variations. A pore depth variation may be represented by the minimal depth variation 410 between depth 404 and depth 406 of the substrate 400.

In one embodiment, the grain size of a porous polycrystalline substrate may be around the size at which phonon scattering begins to dominate over grain boundary scattering. Hole mobility in semiconductor materials is approximately 480 cm$^2$/volt-sec, which implies a phonon scattering time of 0.27 picoseconds. Given the typical hole carrier velocity at the top of the Fermi sea this scattering time implies a mean free path of 273 nanometers (nm). Therefore, in one embodiment, the size at which phonon scattering begins to dominate over grain boundary scattering may be around 273 nm. A polycrystalline substrate according to certain embodiments may include a grain size of approximately 200-500 nm, approximately 250-350 nm, or approximately 300 nm. With 20 nm wide pores etched into the substrate, a high surface area (e.g., hundreds of square meters of surface area/cubic centimeter) material without a high level of surface area variance over a 100 micron thick plate may be produced as there may be sufficient averaging over crystallographic orientation and boundary layer etching variations.

Figure 5:
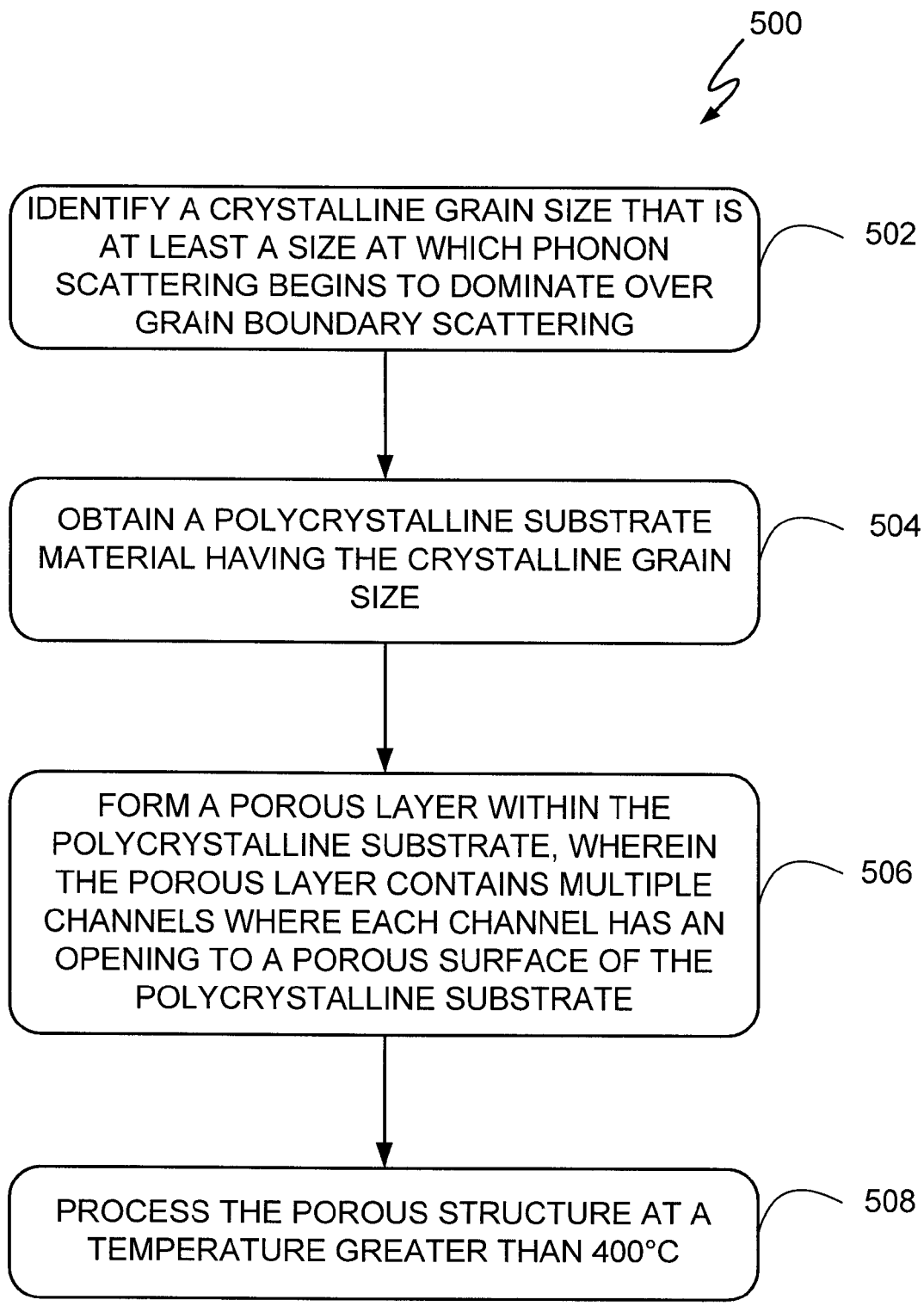
FIG. 5 is a flow diagram representing a method for constructing an optimal porous polycrystalline substrate according to an embodiment of the present invention.

FIG. 5 is a flow diagram 500 representing a method for constructing a porous polycrystalline substrate 500 according to an embodiment of the present invention. At block 502, the method 500 may include identifying a crystalline grain size that is at least a size at which phonon scattering begins to dominate over grain boundary scattering. It should be noted that the grain size should not be so small as to severely increase the substrate resistance, and the grain size should not be so big so as to suffer from the aforementioned shortcomings of a polycrystalline substrate with a large grain size. Essentially, according to an embodiment of the present invention, the grain size that minimizes both unfavorable situations may be identified.

At block 504, the method 500 may include obtaining a polycrystalline substrate material having the crystalline grain size identified in block 502. Obtaining the substrate material may include various forms including, but not limited to, manufacturing the substrate at a manufacturing facility. Manufacturing methods pertaining to one embodiment of the present invention may include the method disclosed in FIG. 6 below.

At block 506, the method 500 may include forming a porous layer containing multiple channels within the polycrystalline substrate. In one embodiment, each channel may have an opening to a porous surface of the polycrystalline substrate. The forming of the channels within the porous layer may be processed by anodic etching or any other process known in the field of forming micron deep pores with nanometer wide diameters.

At block 508, the method 500 may further include processing the porous structure at a temperature greater than 400° C. Because the substrate material may include silicon carbide, the substrate may be highly temperature resistant, allowing processes that require high temperatures, such as the ALD process, to deposit material on the substrate without suffering from issues such as hydrogen desorption or plastic flow.

Figure 6:
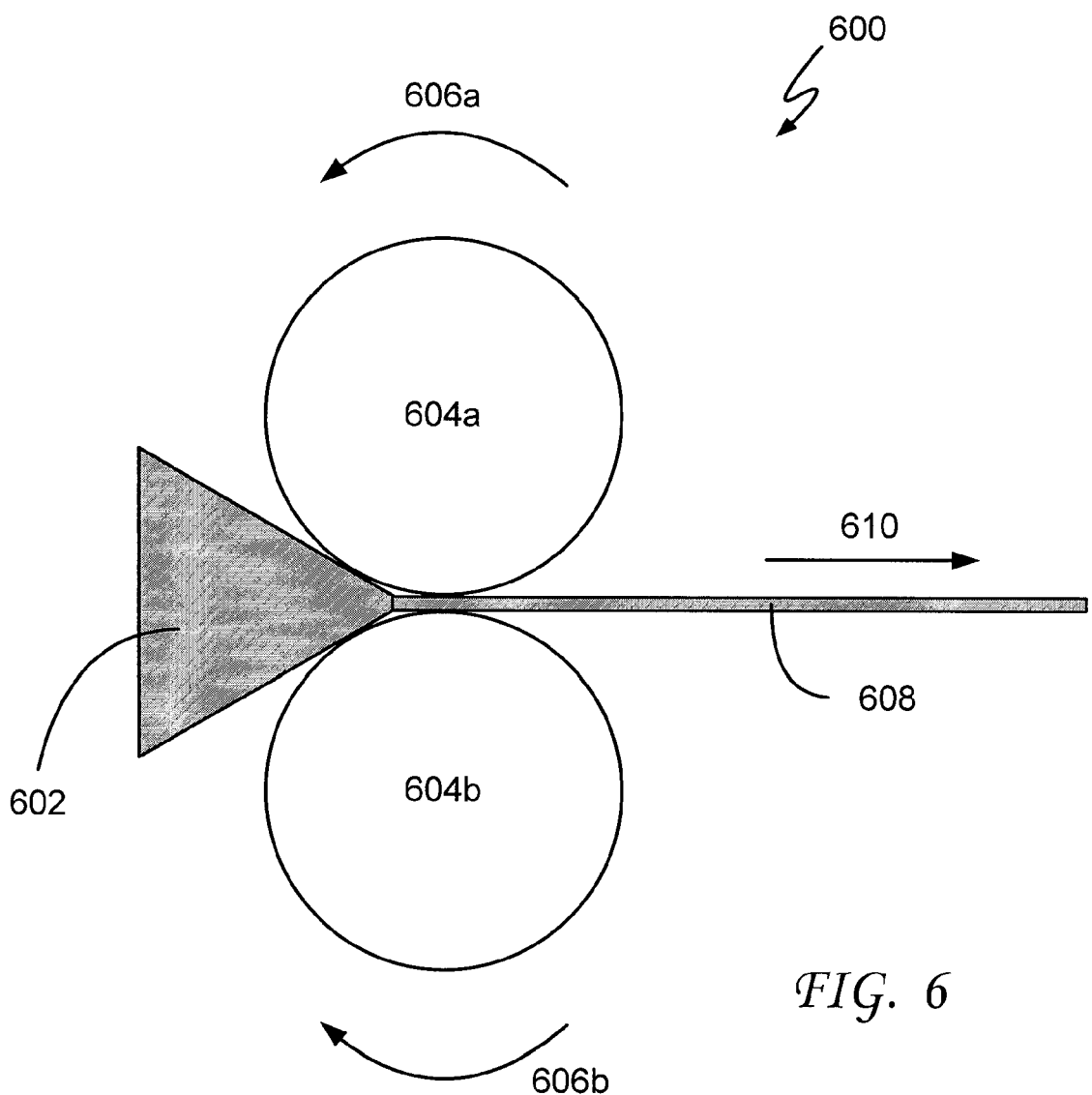
FIG. 6 is a diagram of one embodiment for manufacturing a polycrystalline substrate comprising an optimal grain size according to an embodiment of the present invention.

FIG. 6 is a diagram of an embodiment 600 for manufacturing a polycrystalline substrate having an optimal grain size according to an embodiment of the present invention. A body of molten material 602 (e.g. boron doped silicon) may be extruded between two rollers 604a and 604b into a thin plate of silicon extrusion 608. The rollers 604a and 604b may be composed of silicon carbide rollers which may rotate in directions 606a and 606b, respectively. The thin plate of silicon extrusion may include silicon carbide which may be extruded in direction 610. As the silicon is extruded from the rollers, it cools into polycrystalline form with a certain grain size established by the cooling rate.

In one embodiment, splat cooling of silicon is done by cooling a thin plate of silicon against water-cooled copper at 10$^6$K/second. This very fast cooling produces amorphous material. Very slow cooling, on the other hand, produces grain sizes in excess of many microns in diameter. By extruding the silicon through rollers, the rate at which it is pulled may control the cooling of the silicon such that the silicon cools at the right cooling schedule, thus producing the desired grain size according to an embodiment of the present invention. Other techniques in metallurgy, such as edge-supported string ribbon silicon, may work as well. According to an embodiment of the present invention, a plate thickness may be several hundred microns thick and several meters in length and width.

Figure 7:
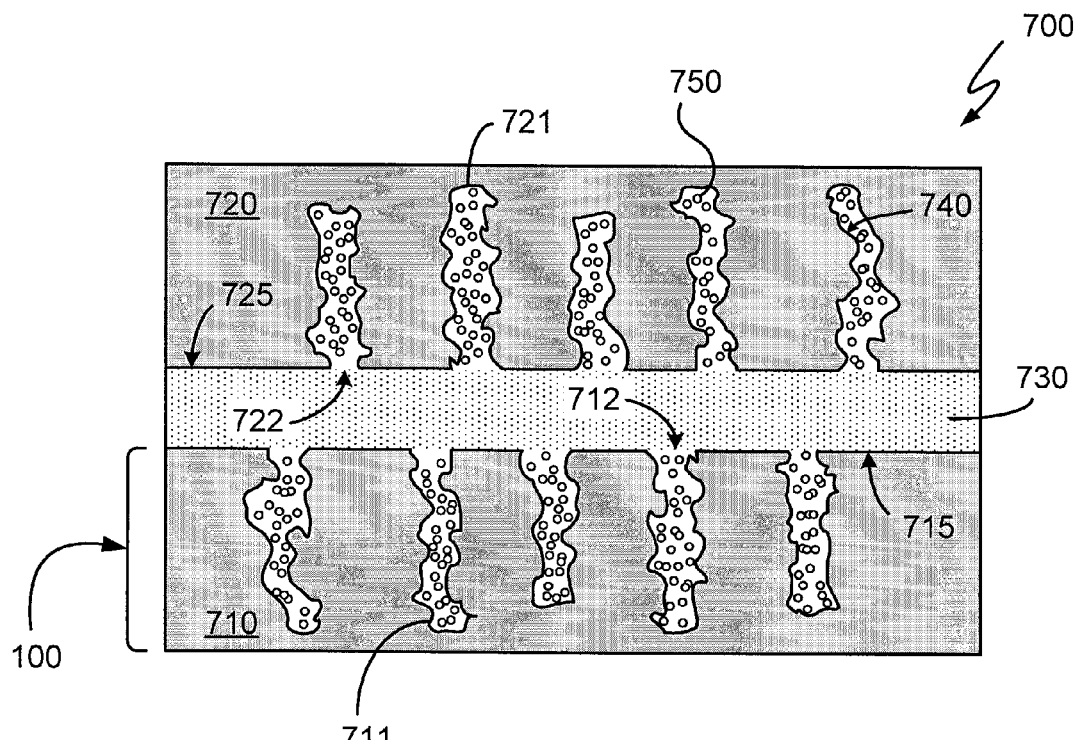
FIGS. 7 and 8 are cross-sectional views of a energy storage device according to embodiments of the present invention.
Figure 8:
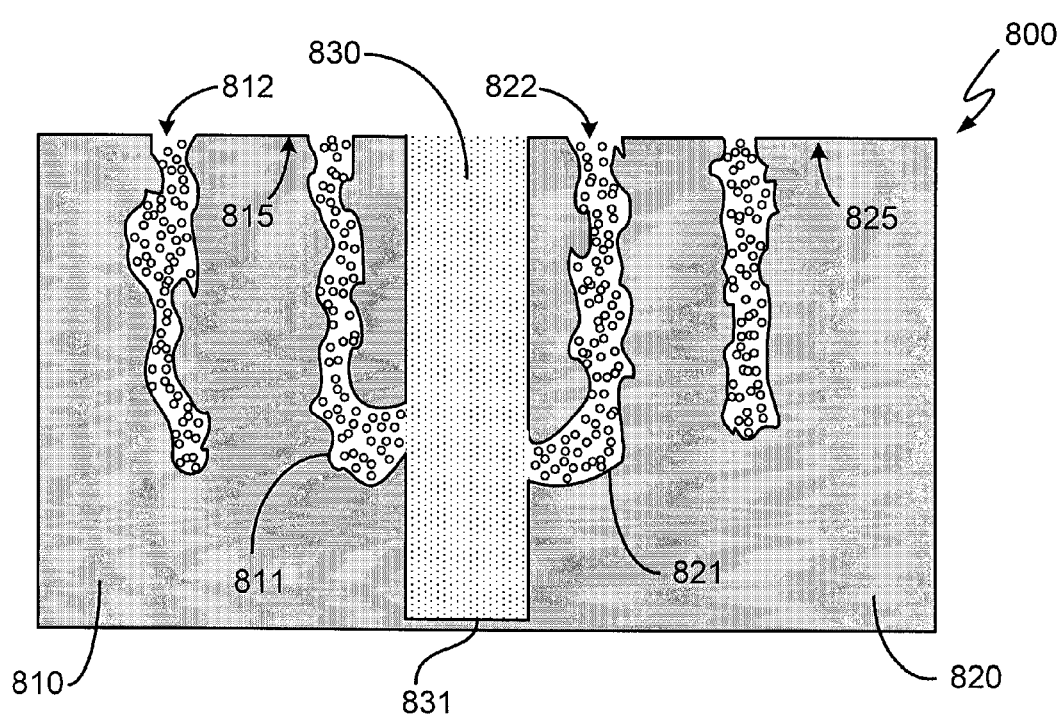

FIGS. 7 and 8 are cross-sectional views of a energy storage device according to an embodiment of the present invention. As illustrated in FIGS. 7 and 8, energy storage device 700 includes a polycrystalline substrate 710 and a polycrystalline substrate 720 separated from each other by an electrical insulator. This electrical insulator could take one of various forms, as discussed in more detail below. At least one of polycrystalline substrates 710 and 720 includes a porous structure 100 (as shown in FIG. 1 but with a majority of the non-porous layer 121 removed) containing multiple channels 711. In the illustrated embodiments, both polycrystalline substrate 710 and polycrystalline substrate 720 include such a porous structure. Accordingly, polycrystalline substrate 710 includes channels 711 with openings 712 to a surface 715 of the corresponding porous structure, and polycrystalline substrate 720 includes channels 721 with openings 722 to a surface 725 of the corresponding porous structure. In an embodiment where only one of polycrystalline substrates 710 and 720 includes a porous structure with multiple channels, the other electrically conductive structure can be, for example, a metal electrode or a non-porous polysilicon structure.

Various configurations of energy storage device 700 are possible. In the embodiment of FIG. 7, for example, energy storage device 700 includes two distinct porous structures (polycrystalline substrate 710 and polycrystalline substrate 720) that have been bonded together face-to-face with an intervening separator 730. As another example, in the embodiment of FIG. 8 energy storage device 800 includes a single planar porous structure in which a first section (polycrystalline substrate 810) is separated from a second section (polycrystalline substrate 820) by a trench 831 containing separator 830. One of the electrically conductive structures will be the positive side and the other electrically conductive structure will be the negative side. Separator 830 permits the transfer of ions but does not allow the transfer of fluid such as would be found in an electrolyte. The polycrystalline substrates of FIGS. 7 and 8 according to certain embodiments may include a grain size that is at least a size at which phonon scattering begins to dominate over grain boundary scattering (e.g., approximately 200-500 nm, approximately 250-350 nm, approximately 300 nm, approximately 273 nm).

FIG. 8 shows a small bridge of material connecting polycrystalline substrate 810 and polycrystalline substrate 820. If left unaddressed, this bridge may act as an electrical short between the two electrically conductive structures. There are several possible solutions, however. For example, the bridge may be removed using a polishing operation. Alternatively, the electrically conductive structures may be formed in a heavily-doped top layer or region of a wafer while the trench extends down to an underlying lightly-doped substrate that is not a very good conductor. In another embodiment, a silicon-on-insulator structure may be used.

As an example, the porous structure of polycrystalline substrates 810 and 820 can be created by a wet etch process in which a liquid etchant applied to a surface of the electrically conductive structures etches away portions of the electrically conductive structure in a way that is at least somewhat similar to the way water is able to carve channels in rock. This is why each one of the channels formed in this way has an opening to the surface of the electrically conductive structure; the wet etch method is incapable of creating fully-enclosed cavities, i.e., cavities with no opening to the surface, like an air bubble trapped inside a rock, within the porous structure. This is not to say that those openings cannot be covered with other materials or otherwise closed up because of the presence of or addition of other materials—that is in fact likely to occur in several embodiments—but, whether covered or not, the described openings to the surface are a feature of each channel in each porous structure according to at least one embodiment of the invention. (One embodiment in which the openings may be covered up is one in which a layer of epitaxial silicon as a location for circuitry or other wiring is grown on top of the channels). Porous structures according to embodiments of the invention can be fabricated with very precise and uniform pore size control (in contrast to active carbon). This allows fast charging (pore size may be optimized in order to be compatible with the size of the ions) and also improves the capacitance (no area will be malfunctioning). This would also allow narrow distribution of voltage fluctuation.

It should be noted in connection with this discussion that porous carbon, being formed in a manner different from that described above, has a different structure—one that is characterized by fully-enclosed cavities having no surface openings. As a result, porous carbon is not suitable—or at least not as desirable—for at least certain embodiments of the invention (although it should be mentioned here that certain other embodiments (such as, for example, the thick electrically conductive structure described below) may contain fully-enclosed cavities). It should also be noted that the FIG. 7 and FIG. 8 depictions of the porous structures are highly idealized in that, to mention just one example, all of channels 811 and 821 are shown as only extending vertically. In reality the channels would branch off in multiple directions to create a tangled, disorderly pattern that may look something like the porous structure shown in FIG. 2.

In one embodiment, energy storage device 700 further includes an electrically conductive coating 740 on at least a portion of the porous structure and in at least some of channels 711. Such an electrically conductive coating may be necessary in order to maintain or enhance the conductivity of the porous structure. As an example, electrically conductive coating 740 may include graphene in one embodiment of the present invention. This material may be applied using processes such as ALD. The layer of graphene may passivate a surface of a pore channel and convert the surface into highly conductive plates. Energy storage device 800 may include an electrically conductive coating 840 on at least a portion of the porous structure and in at least some of channels 811.

As another example, electrically conductive coating 740 may be a coating of metal such as, for example, aluminum, copper, and tungsten, or other electrical conductors such as tungsten nitride, titanium nitride, and tantalum nitride. Each of the listed materials has the advantage of being used in existing CMOS technology. Other metals such as nickel and calcium may also be used as electrically conductive coating 740 or 840. These materials may be applied using processes such as electroplating, chemical vapor deposition (CVD), and/or atomic layer deposition (ALD). It should be noted here that a CVD process of tungsten is self-limiting, meaning that the tungsten will form a couple of monolayers and then stop growing. The resulting thin electrically conductive coating is exactly what is needed for embodiments of energy storage device 700 or 800 because it never gets so thick as to seal off the channels and prevent the CVD gas from penetrating deeper into the channels. If desired, the porous structure can also be doped with a dopant designed to increase the electrical conductivity of the structure (boron, arsenic, or phosphorus, for example, for porous silicon; arsenic or gallium, for example, for porous germanium).

In one embodiment the electrical insulator separating electrically conductive structure 710 from polycrystalline substrate 720 includes a dielectric material. For example, one could make a very high-capacitance capacitor using a porous silicon electrode oxidized with silicon dioxide ($SiO_2$) along with a metal or polysilicon structure as the other electrode. The very high surface area of the porous silicon would be a major contributor to the high capacitance that could be achieved with such a capacitor.

The capacitance could be increased still further—even significantly increased—by placing an electrolyte 750 in physical contact with the porous structure. Electrolyte 750 (as well as other electrolytes described herein) is represented in the drawings using a random arrangement of circles. This representation is intended to convey the idea that the electrolyte is a substance (liquid or solid) containing free ions. The circles were chosen for convenience and are not intended to imply any limitation as to the electrolyte components or qualities, including any limitation with respect to the size, shape, or number of the ions. A typical, though not the only, type of electrolyte that may be used in accordance with embodiments of the invention is an ionic solution.

Figure 9:
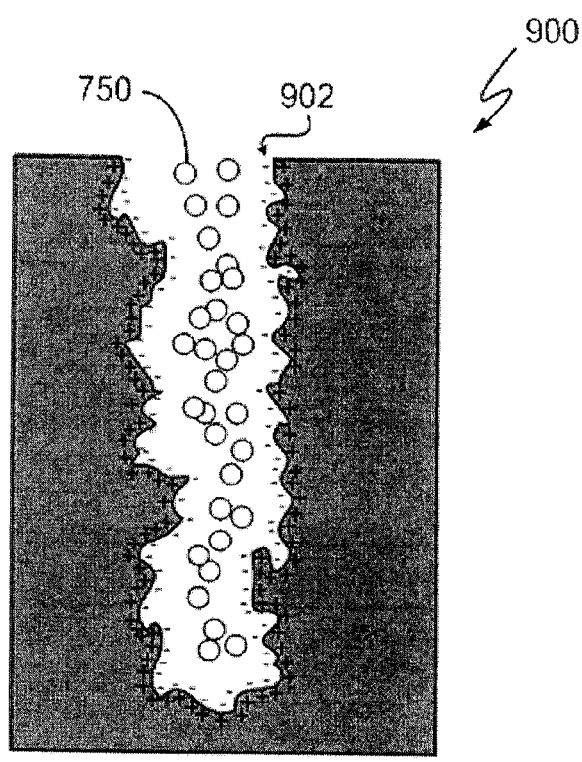
FIG. 9 is a cross-sectional representation of an electric double layer within a channel of a energy storage device according to an embodiment of the present invention.

In an embodiment where electrolyte 750 is used, the electrical insulator separating polycrystalline substrate 710 from polycrystalline substrate 720 can be an electric double layer that is created by the presence of the electrolyte. This electric double layer, depicted schematically in FIG. 9, can complement or replace the dielectric material described above. As illustrated in FIG. 9, an electrical double layer (EDL) 902 has been formed within one of channels 711. EDL 902 is made up of two layers of ions, one of which is the electrical charge of the sidewalls of channel 711 (depicted as being positive in FIG. 9 but which could also be negative) and the other of which is formed by free ions in the electrolyte. EDL 902 electrically insulates the surface, thus providing the charge separation necessary for the capacitor to function. The large capacitance and hence energy storage potential of electrolytic ultracapacitors arises due to the small (approximately 1 nm) separation between electrolyte ions and the electrode.

It should be noted that when energy storage device 700 is discharged then the EDL dissipates. This means that under some circumstances—where the EDL replaces the dielectric layer, for example—polycrystalline substrates 710 and 720 may for a time not be separated from each other by an electrical insulator—at least not the one embodied in the EDL. References herein to "a first electrically conductive structure and a second electrically conductive structure separated from each other by an electrical insulator" specifically include situations where, as described above, the electrical insulator is only present when the energy storage device is electrically charged.

In some embodiments electrolyte 750 is an organic electrolyte. As one example, the electrolyte can be a liquid or solid solution of organic materials such as tetraethylammonium tetrafluoroborate in acetonitrile. Other examples include solutions based on boric acid, sodium borate, or weak organic acids. Alternatively, (non-organic) water could be used as the electrolyte, but this may pose a safety risk in that water may boil and form a gas if the capacitor exceeds a certain temperature, possibly causing the capacitor to explode.

Figure 10:
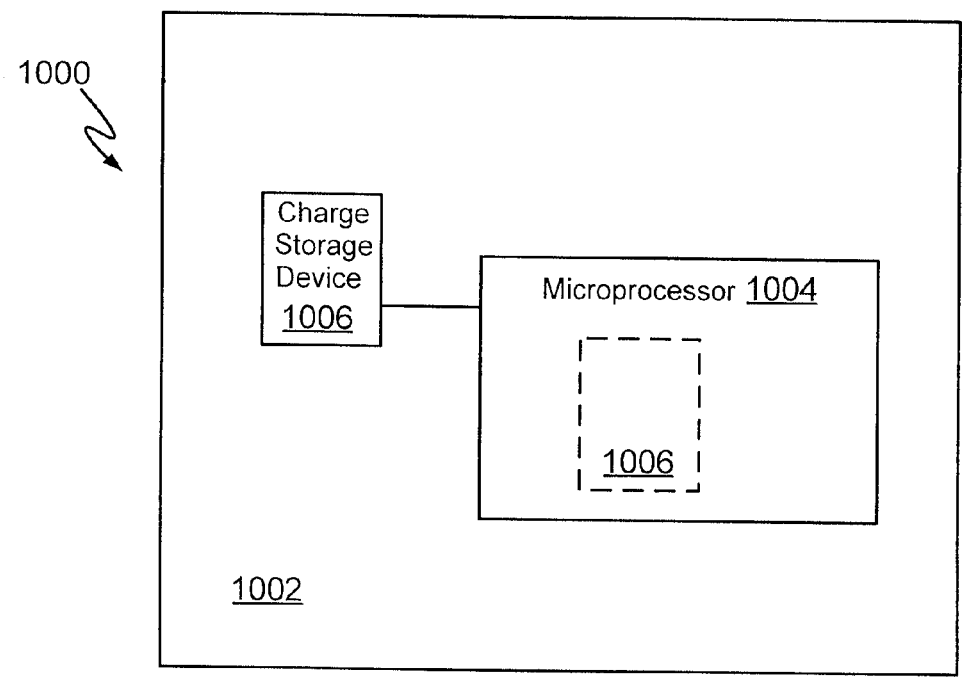
FIG. 10 is a block diagram representing a microelectronic device according to an embodiment of the present invention.

FIG. 10 is a block diagram representing a microelectronic device 1000 according to an embodiment of the invention. As illustrated in FIG. 10, microelectronic device 1000 may include a substrate 1002, a microprocessor 1004 over substrate 1002, and a energy storage device 1006 associated with microprocessor 1004. Energy storage device 1006 can either be located on substrate 1002 away from microprocessor 1004 (e.g., a die-side capacitor), as illustrated in solid lines, or it can be located on microprocessor 1004 itself (e.g., in a build-up layer above the microprocessor), as illustrated in dashed lines. In one embodiment energy storage device 1006 includes first and second electrically conductive structures separated from each other by an electrical insulator, where at least one of the first and second electrically conductive structures includes a polycrystalline substrate having a grain size at least a size at which phonon scattering begins to dominate over grain boundary scattering and a porous structure containing multiple channels within the polycrystalline substrate. In one embodiment, each channel has an opening to a porous surface on the polycrystalline substrate. As an example, this embodiment can be similar to one or more of the embodiments shown in FIGS. 7-9 and described in the accompanying text. In another embodiment energy storage device 1006 includes a plurality of nanostructures (e.g., discrete nanostructures) and an electrolyte in physical contact with at least some of the nanostructures.

The energy storage devices disclosed herein may in some embodiments be used as a decoupling capacitor within microelectronic device 1000—one that is smaller and that, for the reasons described elsewhere herein, offers much higher capacitance and much lower impedance than existing decoupling capacitors. As already mentioned, energy storage device 1006 can be part of a support integrated circuit (IC) or chip or it can be located on the microprocessor die itself. As an example, one might, according to embodiments of the invention, be able to form regions of porous silicon (or the like, as described above) on a microprocessor die and then create a high-surface-area embedded decoupling capacitor right on the substrate of the microprocessor die. Because of the porosity of the silicon, the embedded capacitor would have very high surface area. Other possible uses for the disclosed energy storage devices include use as a memory storage element (where problems with the z-direction size of embedded DRAM approaches may be solved by greatly increasing the farads per unit area) or as a component of voltage converters in voltage boost circuitry, perhaps for use with circuit blocks, individual microprocessor cores, or the like.

As an example, higher capacitance values could in this context be advantageous because parts of the circuit could then run nominally at a certain (relatively low) voltage but then in places where higher voltage is needed in order to increase speed (e.g., cache memory, input/output (I/O) applications) the voltage could be boosted to a higher value. An operational scheme of this sort would likely be preferred over one in which the higher voltage is used everywhere; i.e., in cases where only a small amount of circuitry requires a higher voltage it likely would be preferable to boost voltage from a lower baseline voltage for that small portion of the circuit rather than drop voltage from a higher baseline value for the majority of the circuitry. Future microprocessor generations may also make use of voltage converters of the type described here. Having more capacitance available to be deployed around a package or around a microprocessor die may help solve the existing issue of intolerably high inductance between transistors that transfer voltage around a circuit.

Figure 11:
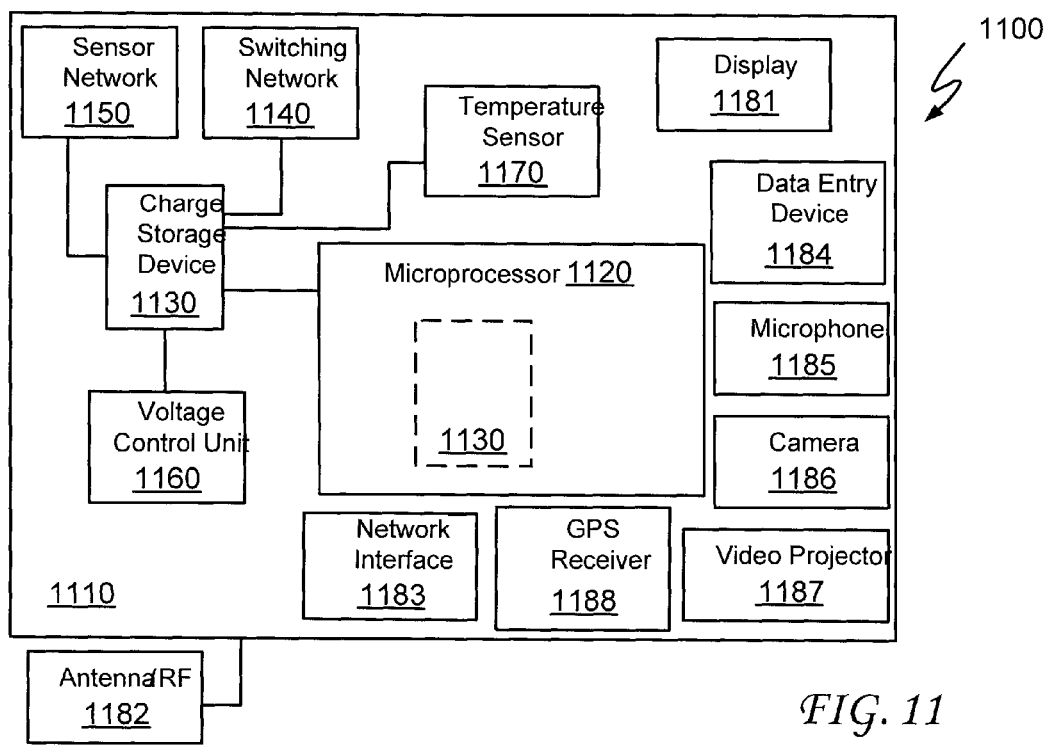
FIG. 11 is a block diagram representing a mobile electronic device according to an embodiment of the present invention.

FIG. 11 is a block diagram representing a mobile electronic device 1100 according to an embodiment of the invention. As illustrated in FIG. 11, mobile electronic device 1100 includes a substrate 1110 on which a microprocessor 1120 and a energy storage device 1130 associated with microprocessor 1120 are disposed. Energy storage device 1130 can either be located on substrate 1110 away from microprocessor 1120, as illustrated in solid lines, or it can be located on microprocessor 1120 itself, as illustrated in dashed lines. In one embodiment, energy storage device 1130 includes first and second electrically conductive structures separated from each other by an electrical insulator, where at least one of the first and second electrically conductive structures includes a porous structure containing multiple channels. As an example, this embodiment can be similar to one or more of the embodiments shown and described herein.

In at least some embodiments energy storage device 1130 is one of a plurality of energy storage devices (all of which are represented in FIG. 11 by block 1130) contained within mobile electronic device 1100. In one or more of those embodiments mobile electronic device 1100 further includes a switching network 1140 associated with the energy storage devices. When a capacitor is being discharged, it doesn't maintain a constant voltage, but instead decays in an exponential manner (unlike a battery where the voltage stays relatively constant during discharge). Switching network 1140 includes circuitry or some other mechanism that switches in and out various capacitors such that a relatively constant voltage is maintained. For example, the energy storage devices could initially be connected to each other in parallel and then, after a certain amount of voltage decay, a subset of the energy storage devices could be changed by the switching network so as to be connected in series such that their individual voltage contributions can boost the declining overall voltage. In one embodiment switching network 1140 could be implemented using existing silicon device technology as used in the art (transistors, silicon controlled rectifiers (SCRs), etc.), while in other embodiments it could be implemented using micro-electromechanical systems (MEMS) relays or switches (which, it may be noted, tend to have very low resistance).

In some embodiments, mobile electronic device 1100 further includes a sensor network 1150 associated with energy storage device 1130. In at least some embodiments each one of the plurality of energy storage devices will have its own sensor that indicates certain behavioral parameters of the energy storage device. For example, the sensors may indicate existing voltage levels as well as the ongoing discharge response, both of which are parameters that may be used by the switching network—especially in cases where the dielectric material (or other electrical insulator) being used is not linear but rather has a dielectric constant that varies with the voltage. In those cases, it may be advantageous to include along with the sensor network a finite state machine such as a voltage control unit 1160 that knows what the behavior of the dielectric is and responds accordingly. A voltage control unit that knows how the dielectric behaves can compensate for any non-linearity. A temperature sensor 1170 associated with energy storage devices 1130 may also be included in order to sense temperature (or other safety-related parameters). In certain embodiments of the invention, mobile electronic device 1100 further includes one or more of: a display 1181, antenna/RF elements 1182, a network interface 1183, a data entry device 1184 (e.g., a keypad or a touchscreen), a microphone 1185, a camera 1186, a video projector 1187, a global positioning system (GPS) receiver 1188, and the like.

In one embodiment, a device (e.g., microelectronic device, mobile electronic device) includes a substrate, a microprocessor over the substrate, and a energy storage device associated with the microprocessor. The energy storage device includes a first electrically conductive structure, a second electrically conductive structure, and an electrical insulator to separate the conductive structures from each other. At least one of the first electrically conductive structure and the second electrically conductive structure may include a polycrystalline substrate having a grain size that is at least a size at which phonon scattering begins to dominate over grain boundary scattering. In certain embodiments, the size is approximately 200-500 nm, approximately 250-350 nm, approximately 300 nm, or approximately 273 nm. In one embodiment, the polycrystalline substrate can include a porous layer having multiple channels with each channel having an opening to a porous surface of the polycrystalline substrate. The polycrystalline substrate includes at least one of silicon, silicon carbide, germanium, carbon, tin, and any other material that can be anodically etched to make porous structures in the material. The polycrystalline substrate may be less than a millimeter in thickness.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the energy storage devices and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A structure, comprising:
a first polycrystalline substrate having a grain size that is designed around a size at which phonon scattering begins to dominate over grain boundary scattering; and
a first porous layer formed within the first polycrystalline substrate, wherein the first porous layer contains multiple channels, wherein the grain size of the first polycrystalline substrate is designed between 250 and 350 nanometers (nm) to allow for a uniform first porous layer because the grain boundaries are evenly distributed throughout the first polycrystalline substrate which causes averaging of pore depth variations.

2. The structure of claim 1, further comprising:
a second polycrystalline substrate having a grain size that is at least a size at which phonon scattering begins to dominate over grain boundary scattering;
a second porous layer formed within the second polycrystalline substrate, wherein the second porous layer contains multiple channels with each channel having an opening to a porous surface of the second polycrystalline substrate; and
an insulating material formed between the first and second polycrystalline substrates, wherein each channel of the first porous layer includes an opening to a porous surface of the first polycrystalline substrate.

3. The structure of claim 2, wherein the multiple channels are coated with graphene.

4. The structure of claim 2, wherein at least one of the first and second polycrystalline substrates comprises at least one of silicon, silicon carbide, germanium, carbon, tin, and any other material that can be etched to make porous materials.

5. The structure of claim 2, wherein at least one of the first and second polycrystalline substrates comprises at least one of silicon and silicon carbide.

6. The structure of claim 2, wherein the first and second polycrystalline substrates are each less than a millimeter in thickness, wherein first and second polycrystalline substrate each include a surface area with hundreds of square meters of surface area per cubic centimeter of material, wherein the first polycrystalline substrate includes a non-porous layer.

7. The structure of claim 1, wherein the grain size of the first polycrystalline substrate is between 200 and 500 nanometers (nm).

8. The structure of claim 1, wherein the porous layer has a pore size of approximately 20 nanometers (nm).

9. The structure of claim 2, wherein the grain size of the first and second polycrystalline substrates is between 250 and 350 nanometers (nm).

10. A energy storage device, comprising:
a first electrically conductive structure;
a second electrically conductive structure;
an electrical insulator separating the first electrically conductive structure from the second electrically conductive structure, wherein at least one of the first electrically conductive structure and the second electrically conductive structure includes a polycrystalline substrate having a grain size that is designed around a size at which phonon scattering begins to dominate over grain boundary scattering, wherein the grain size of the polycrystalline substrate is designed between 250 and 350 nanometers (nm) to allow for a uniform porous layer to be formed within the polycrystalline substrate because the grain boundaries are evenly distributed throughout the polycrystalline substrate which causes averaging of pore depth variations.

11. The energy storage device of claim 10, wherein the porous layer contains multiple channels with each channel having an opening to a porous surface of the polycrystalline substrate.

12. The energy storage device of claim 11, wherein the polycrystalline substrate comprises at least one of silicon, silicon carbide, germanium, carbon, tin, and any other material that can be anodically etched to make porous materials.

13. The energy storage device of claim 10, wherein the polycrystalline substrate is below a millimeter in thickness.

14. The energy storage device of claim 10, wherein the polycrystalline substrate comprises silicon.

15. The energy storage device of claim 10, wherein the polycrystalline substrate comprises silicon carbide.

16. The energy storage device of claim 10, wherein the grain size of the polycrystalline substrate is between 200 and 500 nanometers (nm).

17. A device, comprising:
a substrate;
a microprocessor over the substrate; and
a energy storage device associated with the microprocessor, the energy storage device comprises a first electrically conductive structure, a second electrically conductive structure, and an electrical insulator to separate the conductive structures from each other, wherein at least one of the first electrically conductive structure and the second electrically conductive structure includes a polycrystalline substrate having a grain size that is designed around a size at which phonon scattering begins to dominate over grain boundary scattering, wherein the grain size of the polycrystalline substrate is designed between 250 and 350 nanometers (nm) to allow for a uniform porous layer formed within the polycrystalline substrate because the grain boundaries are evenly distributed throughout the polycrystalline substrate which causes averaging of pore depth variations.

18. The device of claim 17, wherein the porous layer contains multiple channels with each channel having an opening to a porous surface of the polycrystalline substrate.

19. The device of claim 17, wherein the polycrystalline substrate comprises at least one of silicon, silicon carbide, germanium, carbon, tin, and any other material that can be anodically etched to make porous structures in the material.

20. The device of claim 17, wherein the polycrystalline substrate is below a millimeter in thickness.

21. The device of claim 18, wherein the porous layer contains multiple channels extending from a side of the substrate into a portion of the substrate.

22. The device of claim 17, wherein the polycrystalline substrate comprises silicon.

23. The device of claim 17, wherein the polycrystalline substrate comprises silicon carbide.

24. The device of claim 17, wherein the grain size of the polycrystalline substrate is between 200 and 500 nanometers (nm).

\* \* \* \* \*